US012698884B2

(12) United States Patent
Simonetti et al.

(10) Patent No.: US 12,698,884 B2
(45) Date of Patent: Aug. 4, 2026

(54) METHOD AND SYSTEM FOR PROVIDING ILLUMINATION

(71) Applicant: HTI Technology and Industries, Inc., Peabody, MA (US)

(72) Inventors: John Simonetti, Lynnfield, MA (US); Steve Sweeney, Beverly, MA (US)

(73) Assignee: HTI Technology and Industries, Inc., Peabody, MA (US)

(*) Notice: Subject to any disclaimer, the term of this patent is extended or adjusted under 35 U.S.C. 154(b) by 0 days.

(21) Appl. No.: 18/441,325

(22) Filed: Feb. 14, 2024

(65) Prior Publication Data

US 2024/0280244 A1 Aug. 22, 2024

Related U.S. Application Data

(60) Provisional application No. 63/486,463, filed on Feb. 22, 2023.

(51) Int. Cl.

| | |
|---|---|
| ***F21V 11/16*** | (2006.01) |
| ***F21V 23/00*** | (2015.01) |
| ***F21V 23/04*** | (2006.01) |
| ***F21Y 115/10*** | (2016.01) |
| ***G09F 13/04*** | (2006.01) |

(52) U.S. Cl.
CPC ............ *F21V 11/16* (2013.01); *F21V 23/003* (2013.01); *F21V 23/0435* (2013.01); *F21V 23/0485* (2013.01); *G09F 13/04* (2013.01); *F21Y 2115/10* (2016.08)

(58) Field of Classification Search
CPC .. G09F 13/04; F21V 23/0435; F21V 23/0485; G02F 1/133602
See application file for complete search history.

(56) References Cited

U.S. PATENT DOCUMENTS

| | | | | |
|---|---|---|---|---|
| 3,997,991 | A * | 12/1976 | Hayman-Chaffey | G09F 13/10 40/361 |
| 2012/0320622 | A1 * | 12/2012 | Sanders | G09F 23/00 362/602 |
| 2015/0233560 | A1 * | 8/2015 | Cheng | B60Q 1/325 362/190 |
| 2018/0106462 | A1 * | 4/2018 | Su | G09F 13/005 |
| 2019/0137678 | A1 * | 5/2019 | Weeda | G02B 6/0021 |

* cited by examiner

*Primary Examiner* — William N Harris
(74) *Attorney, Agent, or Firm* — Emerson, Thomson & Bennett, LLC; Roger D. Emerson; Allison V. Trimble

(57) ABSTRACT

Provided is an illumination system comprising a polymer piece, a Printed Circuit Board Assembly (PCBA), or Flexible Printed Circuit (FPC) and one or more Light Emitting Diodes (LEDs). The PCBA may be located behind the polymer piece and may include one or more LEDs. The PCBA can control LEDs and direct certain LEDs to illuminate the polymer piece.

14 Claims, 2 Drawing Sheets

METHOD AND SYSTEM FOR PROVIDING ILLUMINATION

CROSS-REFERENCE TO RELATED APPLICATIONS

This application claims the benefit of U.S. Provisional Application No. 63/486,463, entitled METHOD AND SYSTEM FOR PROVIDING ILLUMINATION, filed Feb. 22, 2023, which is fully incorporated herein by reference.

I. BACKGROUND

This disclosure is directed to a system for providing illumination from behind a polymer piece.

II. SUMMARY OF THE INVENTION

In accordance with one aspect of this disclosure, an illumination system includes a display component having a viewing side and include a first portion and a second portion and optionally other portions. A graphic indicia is formed as a sub-layer on a surface adjacent the display component opposite the viewing side. A light emitting diode (LED) assembly is formed as a sub-layer adjacent to the graphic indicia. The LED assembly includes a first illuminating portion and a second illuminating portion, and optionally other illuminating portions, to provide backlighting illumination respectively to the first and second portions (and any other portions) of the display component. A circuit board provides structural support and electronic control connectivity to the LED assembly. A microcontroller is mounted to the circuit board for controlling the operation of the LED assembly with respect to the first and second portions (and any other portions) of the display component.

In one aspect, the display component can include a polymer piece formed of polycarbonate. The polymer piece can be formed of either clear or translucent polycarbonate. The polymer piece can be molded onto one or both of the graphic indicia or the LED assembly. The graphic indicia can be a silicon graphic formed of at least one layer of silicon or a combination of silicon and polycarbonate materials.

In another aspect, the microcontroller can be configured to separately control the first and second illuminating portions (and any other illuminating portions) associated respectively with the first and second portions (and any other portions). The circuit board and LED assembly can include one or more capacitive sensors for operating one or more functions of the microcontroller. The capacitive sensors can be configured to direct various functions of the microcontroller which can include (but are not limited to): raising and lowering brightness of a portion or portions of the LED assembly, and/or activating and deactivating one or more portions of the LED assembly. The microcomputer can be connected to the circuit board via a wired or a wireless connection.

Other benefits and advantages of the invention will become apparent to those skilled in the art to which it pertains upon a reading and understanding of the following detailed specification.

III. BRIEF DESCRIPTION OF THE FIGURES

The disclosure may take physical form in certain parts and arrangement of parts, aspects of which will be described in detail in this specification and illustrated in the accompanying figures which form a part hereof.

IV. DETAILED DESCRIPTION

Figure 1:
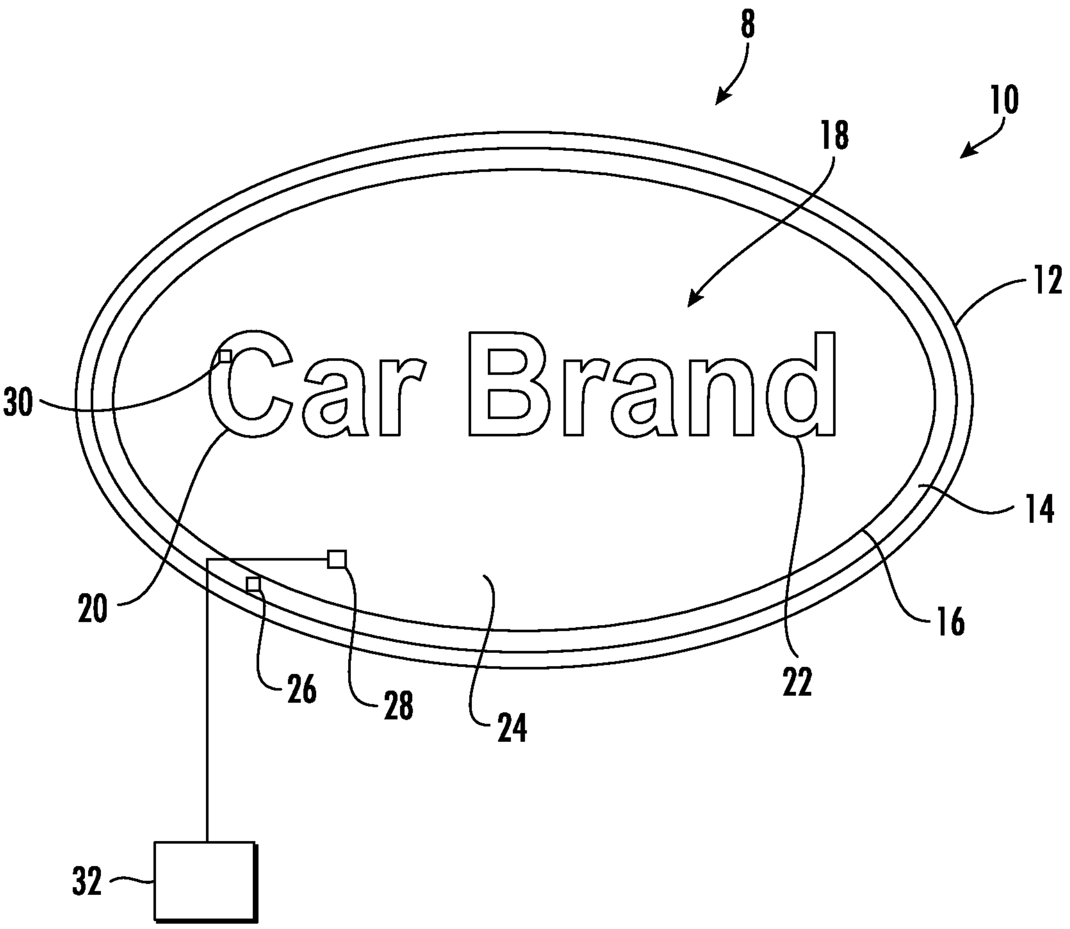
FIG. 1 is a plan view of an illumination system with a polymer piece in accordance with an exemplary embodiment of the present invention.

Reference is now made with respect to the figures wherein the showings are for purposes of illustrating aspects of the disclosure only and not for purposes of limiting the same, and wherein like reference numerals are understood to refer to like components.

Figure 2:
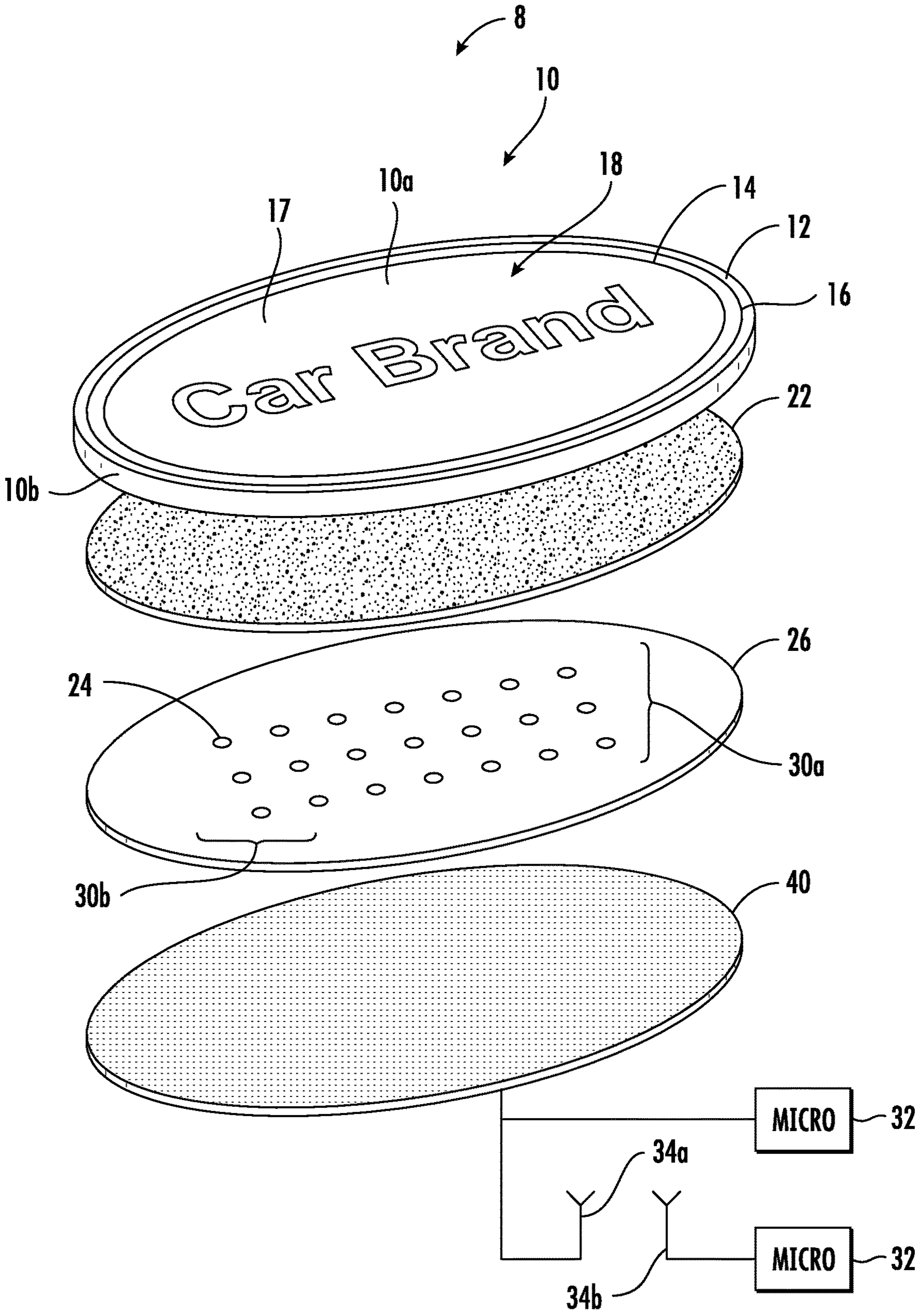
FIG. 2 is an oblique exploded view of the illumination system with the polymer piece in accordance with an exemplary embodiment of the present invention.

FIGS. 1 and 2 depict an illumination system 8. The illumination system 8 may include a display component 10 having a top viewing side 10*a* and a bottom surface 10*b* opposite the viewing side 10*a*. The display component 10 can be a polymer piece formed of a polymer such as polycarbonate. The polymer piece 10 can be made from injection molding or In Mold forming processes and can be a clear or translucent polycarbonate having various degrees of opacity.

With continued reference to FIGS. 1 and 2, the display component 10 can include a graphic indicia 22 formed as a sub-layer adjacent the bottom surface 10*b* of the display component opposite the viewing side. The graphic indicia 22 a polycarbonate or silicon graphic formed of one or more layers.

With continued reference to FIGS. 1 and 2, the display component 10 can have text painted, coated, or etched into/onto it. The display component 10 can have an outer portion 12 and can include a first portion 14 adjacent to the outer portion 12. The display component 10 can have a dividing structure 16 adjacent to the first portion 14. Adjacent to the dividing structure 16 can be a second portion 17. The outer portion 12, the first portion 14, the dividing structure 16, and the second portion 17 can all be formed of a polymer such as polycarbonate and can be formed as a single integral component or as a respective plurality of components. The portion 17 can also be a graphic silicone layer which can be assembled into structure. Other distinct portions besides the first and second portions 14, 17 could also be formed. The display component 10 can also include a design 18 which can be a text or a logo. The design 18 could be the name of an automobile manufacturer. The design 18 can be formed on the viewing side 10*a* or the bottom surface 10*b*.

With further reference to FIGS. 1 and 2, a Light Emitting Diode (LED) assembly 26 can be positioned behind the display component 10 to provide illumination. The LED assembly 26 is preferably fabricated as a sub-layer adjacent the graphic indicia 22. The LED assembly 26 can include a first illuminating portion 30*a* and a second illuminating portion 30*b* to provide backlighting illumination respectively to the respective first and second portion 14, 17 of the display component 10. The display component 10 the illumination system 8 can be manufactured via molded polycarbonate or molded silicon.

With ongoing reference to FIGS. 1 and 2, the LED assembly 30 of the illumination system 8 can include one or more Light Emitting Diodes (LEDs) 24. The one or more LEDs 24 can be placed on a board 40 that is positioned behind display component 10 so that when one or more LEDs 24 are powered, they shine through the display component 10. The display component 10 can have LEDs 24 in different positions behind it. Optionally, the polymer piece 10 can be molded onto or laminated to one or both of the graphic indicia 22 and/or the LED assembly 26.

With additional reference to FIGS. 1 and 2, the display component 10 can have one or more LEDs 24 behind or embedded within first portion 14 and/or one or more LEDs 24 behind or in the second portion 17. For example, as depicted in FIG. 1, a single LED 26, can behind or embedded within the second portion 17. The display component 10 can have one or more LEDs 24 behind or embedded within the design 18, such as LED 28. The LEDs as employed in this disclosure can be provided by several LED manufacturers. The display component 10 can have multiple LEDs positioned behind the entire polymer piece 10.

As depicted in FIGS. 1 and 2, the LEDs 24 in this disclosure can be located on or connected to a Printed Circuit Board Assembly (PCBA) or Flexible Printed Circuit Assembly (FPC) 30. The PCBA/FPC 30 can be located behind the display component 10, and the LEDs 24 can be mounted thereupon, though the PCBA/FPC 30 can optionally be a separate component. The circuit board (PCBA/FPC) 30 can provide structural support and electronic control connectivity to the LED assembly 26 or laminated/heat stakes to a support structure. The PCBA/FPC 30 can incorporate a microcontroller 32, for controlling the operation of the LED assembly 26 with respect to the first and second portions 14, 17 and any other portions of the display component 10. The PCBA/FPC can also communicate to control circuitry located on host system.

In the embodiment of FIGS. 1 and 2, the PCBA/FPC 30 can control LEDs 24 that are in various positions behind/in the polymer piece of the display component 10. The PCBA/FPC 30 with microcontroller 32 can be programmed to power certain LEDs and not others. To wit, the microcontroller 32 can be configured to separately control the at first illuminating portion 30*a* and the second illuminating portion 30*b* associated with the first portion 14 and the second portion 17. The PCBA/FPC 30 with microcontroller 32 can control the LEDs 24 to have higher or lower brightness, for raising and lowering brightness of a portion of the LED assembly 26 or to activate and deactivate a portion of the LED assembly 26.

In the embodiment of FIGS. 1 and 2, the PCBA/FPC 30 with microcontroller 32 can be programmed so as to control the LEDs 24 so that certain LEDs 24 illuminate the polymer piece 10 and others do not. For example, PCBA/FPC 30 may direct the LEDs 24 behind the design 18 such as the LED 28 to illuminate while directing the LED 26 to not illuminate. The PCBA/FPC 30 with microcontroller 32 can direct the LEDs 24 to illuminate behind the polymer piece 10 at a first side of the design 18 but not at a second side of the design 18. The PCBA/FPC 30 with microcontroller 32 can direct the LEDs 24 to illuminate the first portion 14 but not the second portion 17. PCBA/FPC 30 with microcontroller 32 can be controlled from a second computer, such as a wirelessly connected computer via antennas 34*a*, 34*b* such that the second computer is not be physically connected to the PCBA/FPC 30.

The following is a method for illuminating a display component 1*a* formed as a polymer piece 10. A polymer piece 10 is provided, along with a PCBA/FPC 30, and one or more LEDs 24. Optionally, a step can be performed of positioning the PCBA/PFC 30 behind the polymer piece 10. Another step is performed of programming the PCBA/FPC 30 to be able to control one or more LEDs 24. A further step is performed of instructing the PCBA/FPC 30 to control and power one or more LEDs 24.

Numerous embodiments have been described herein. It will be apparent to those skilled in the art that the above methods and apparatuses can incorporate changes and modifications without departing from the general scope of this invention. It is intended to include all such modifications and alterations in so far as they come within the scope of the appended claims or the equivalents thereof.

What is claimed:

1. An illumination system, comprising:

a display component having a viewing side and a bottom surface opposite the viewing side, the display component comprising at least a first portion and a second portion;

a graphic indicia formed as a sub-layer on the bottom surface adjacent the display component opposite the viewing side;

a light emitting diode (LED) assembly formed as a sub-layer adjacent the graphic indicia and comprising at least one LED positioned behind the bottom surface of the display component to provide backlighting illumination, the LED assembly including at least a first illuminating portion and a second illuminating portion to provide the backlighting illumination respectively to the at least one first portion and second portion of the display component;

a circuit board for providing structural support and electronic control connectivity to the LED assembly, wherein the LED assembly comprises at least one LED placed on the circuit board that is positioned behind the bottom surface of the display component so that when the at least one LED is powered, the at least one LED shines through the display component; and a microcontroller connected to the circuit board for controlling the operation of the LED assembly with respect to the at least first portion and second portion of the display component.

2. The illumination system of claim 1, wherein the display component comprises a polymer piece formed of polycarbonate.

3. The illumination system of claim 2, wherein the polymer piece is formed of one of clear or translucent polycarbonate.

4. The illumination system of claim 2, wherein the polymer piece is molded onto at least one of the graphic indicia or the LED assembly.

5. The illumination system of claim 1, wherein the graphic indicia is a silicon graphic formed of at least one layer of silicon.

6. The illumination system of claim 1, wherein the microcontroller is configured to separately control the at least first illuminating portion and second illuminating portion associated with the at least first portion and second portion.

7. The illumination system of claim 1, wherein the circuit board and LED assembly comprise at least one capacitive sensor for operating at least one function of the microcontroller.

8. The illumination system of claim 1, wherein the microcomputer is wirelessly connected to the circuit board.

9. The illumination system of claim 7, wherein the at least one capacitive sensor is configured to direct the at least one function of the microcontroller for raising and lowering brightness of at least a portion of the LED assembly.

10. The illumination system of claim 7, wherein the at least one capacitive sensor is configured to direct the at least one function of the microcontroller to activate and deactivate at least a portion of the LED assembly.

11. The illumination system of claim 1, wherein the circuit board comprises one of a Printed Circuit Board Assembly (PCBA) or Flexible Printed Circuit Assembly (FPC) located behind the bottom surface of the display component.

12. The illumination system of claim 1, wherein the LED assembly comprises at least one LED embedded within the first portion and at least one LED embedded within the second portion.

13. An illumination system, comprising:

a display component having a viewing side and a bottom surface opposite the viewing side, the display component comprising at least a first portion and a second portion;

a graphic indicia formed as a sub-layer on a surface adjacent the bottom surface of the display component opposite the viewing side;

a light emitting diode (LED) assembly comprising at least one LED placed on a board that is positioned behind the bottom surface of the display component to provide illumination such that when the at least one LED is powered, the at least one LED shines through the bottom surface of the display component, wherein the LED assembly is formed as a sub-layer adjacent the graphic indicia, including at least a first illuminating portion and a second illuminating portion to provide backlighting illumination respectively to the at least one first portion and second portion of the display component;

wherein the board is a circuit board for providing structural support and electronic control connectivity to the LED assembly; and a microcontroller connected to the circuit board for controlling the operation of the LED assembly with respect to the at least first portion and second portion of the display component.

14. An illumination system, comprising:

a display component having a viewing side and a bottom surface opposite the viewing side, the display component comprising at least a first portion and a second portion;

a graphic indicia formed as a sub-layer on the bottom surface adjacent the display component opposite the viewing side;

a light emitting diode (LED) assembly comprising at least one LED embedded within at least one of the first portion or the second portion adjacent the graphic indicia and thereby including at least a first illuminating portion and a second illuminating portion to provide backlighting illumination respectively to the at least one first portion and second portion of the display component; and a microcontroller connected to the circuit board for controlling the operation of the LED assembly with respect to the at least first portion and second portion of the display component.

* * * * *